United States Patent [19]

Bratten

[11] Patent Number: 4,622,145
[45] Date of Patent: Nov. 11, 1986

[54] DRUM FILTER

[76] Inventor: Jack R. Bratten, 5970 St. James Dr., West Bloomfield, Mich. 48033

[21] Appl. No.: 520,184

[22] Filed: Aug. 4, 1983

Related U.S. Application Data

[63] Continuation-in-part of Ser. No. 444,970, Nov. 29, 1982, abandoned.

[51] Int. Cl.$^4$ .............................................. B01D 33/08
[52] U.S. Cl. .................................. 210/404; 210/406; 210/411; 210/427; 74/813 C
[58] Field of Search ............. 74/126, 128, 142, 813 C, 74/816, 817, 820, 822; 210/791, 798, 784, 391, 394, 167, 393, 400, 401, 411, 402, 404, 406, 409, 427

[56] References Cited

U.S. PATENT DOCUMENTS

| | | | |
|---|---|---|---|
| 3,724,248 | 4/1973 | Obermann | 74/128 |
| 3,745,856 | 7/1973 | Aaron et al. | 74/128 |
| 3,868,091 | 2/1975 | Hoffman | 74/142 |
| 4,066,554 | 1/1978 | Guyer | 210/402 |
| 4,222,291 | 9/1980 | Murphy, Jr. | 74/128 |
| 4,273,655 | 6/1981 | Reid | 210/402 |
| 4,372,181 | 2/1983 | Tinsley | 74/128 |
| 4,407,720 | 10/1983 | Bratten | 210/777 |
| 4,480,510 | 11/1984 | Aparicio, Jr. et al. | 74/128 |

*Primary Examiner*—Richard V. Fisher
*Assistant Examiner*—Wanda L. Millard

*Attorney, Agent, or Firm*—John R. Benefiel

[57] ABSTRACT

A drum filter is disclosed mounted vertically within a tank which receives the liquid to be filtered. The drum is provided with inside and outside filter media layers and intermediate axially extending passages receiving filtered liquid flow, which is collected in a central tube extending vertically upward and adapted to be connected to a suction pump.

A backwash arrangement includes a backwash flow passage directing flow successively through each of the axial passages as the drum is incrementally rotated about its axis.

Collection troughs are positioned extending axially along the inside and outside periphery of the drum member so as to receive the backwashing flow and contaminants, with a flushing flow carrying off the contaminants from the tank for secondary filtration.

The rotary indexing drive consists of a cylinder actuated ratchet drive with a sprocket wheel in engagement with a chain track located about the interior diameter of the drum member at its upper end.

A surrounding shroud extends about the periphery of the drum member in some embodiments which ensures that the filter media layers are covered with liquid even if the liquid level in the tank declines below the level of the upper section of the media layers.

30 Claims, 8 Drawing Figures

DRUM FILTER

CROSS-REFERENCE TO RELATED APPLICATION

This application is a continuation-in-part of application Ser. No. 06/444,970, filed Nov. 29, 1982, now abandoned.

BACKGROUND OF THE INVENTION

The present invention is concerned with filters and more particularly filters of the type including a filter media layer disposed within a tank of unfiltered liquid and in which the tank liquid is caused to pass through filter media layer and collected for return.

U.S. Pat. No. 4,407,720 also discloses such a filter which is adapted to filter liquid disposed in a settling tank such as is used for filtration of cutting fluids used in industrial production of machined parts.

The filter disclosed in that arrangement takes the form of a drum member having a filter media layer disposed over a series of axial passages with the drum member rotatably mounted on a horizontally disposed central tube. The interior of the tube is arranged to receive filtration flow through the filter media layer into the axial passages for return to the system. In order to establish a connection with an external pump, the central tube is clamped against an aperture in the sidewall of the tank with the aperture in turn in fluid communication with suitable fittings for connection with the circulation pump.

In this design, the drum is caused to be rotated so as to enable a backwashing arrangement to be employed which greatly reduces the need for removal of the drum for for cleaning purposes. In this arrangement, backwashing flow is directed successively through the axial passages by means of a stationary backwash flow porting member having an opening positioned to successively be in registry with open ends of the axial flow passages as the drum is rotated.

This arrangement has been highly successful in reducing the need for removal and cleaning of the drum to reduce the need for a separate storage tank since it does not shut down filtration through those axial passages which are not subjected to the backwashing flow during the rotation of the drum member. This general arrangement thus allows the elimination of separate storage tanks to provide a flow of filtered liquid during backwashing operation and also reduces the need for removal and cleaning of the drum itself.

The drum configuration produces a relatively great surface filtration area for the unit flow space required. However, the horizontal axis arrangement of the drum and the need for making a fluid connection to the tube adds to the complexity of the arrangement. Also, the drive for the drum entails use of a chain drive extending downwardly into the interior of the tank which makes the drive components relatively inaccessible without removal of the drum from the tank.

The horizontal configuration of the drum also precludes filtering flow to the interior of the drum since the accumulated solids cannot be effectively removed, and the heavier particles cannot settle out in the tank. This limits the area available for filtering flow. Similarly, during the backwash operation, the contaminants would be trapped within the interior of the drum and could not be effectively removed from the interior space within the drum member.

The backwashing process itself, in most filtering arrangements, does not effectively remove the "fines" or smaller sized contaminants in a tank type filter unit, that is, a backwashing is often combined with scraping to remove the solid materials accumulating at the surface of the filter media.

In a tank type filter, the heavier particles sink to the bottom of the settling tank and are removed by a suitable means such as a drag conveyor within the interior. However, the smaller, lighter particles have a tendency to remain in suspension within the liquid and thus are drawn immediately again to the surface of the filter media layer upon resumption of normal filtering flow.

In industrial tank type filter installation, problems have been encountered due to fluctuations in the liquid level in the tank. If the filtering element becomes uncovered, air is drawn into the pumping system, causing interruptions in the flow of filtered liquid. Even if the liquid approaches the filter element, vortices may form, which also can allow entry of air into the pumping system with similar results. The tanks thus had to be sized to contain a sufficient volume of liquid to insure a minimum level throughout the cycle of the apparatus. In many instances, such tanks are positioned in excavations, such that the increased volume tanks added considerably to the expense of the filtering apparatus.

DISCLOSURE OF THE INVENTION

The present invention discloses an improved rotary drum filter for tank type filtering arrangements and also improved backwashing for such filters. According to the present invention, a drum member is mounted for rotation about a vertical axis and both the interior and exterior surfaces carry a filter media layer, with intermediate annularly arranged axial passages receiving filtering flow through both of the media layers, to greatly increase the filter surface area with the same space as occupied by the horizontally mounted drum filters.

The vertical orientation of the rotary drum enables settling out of the contaminants in the interior of the drum to the bottom of the tank during filtering and backwashing operations, such that both the interior and exterior surfaces of the drum may carry a filter media layer. The drum member may be mounted on a central tube which extends vertically upwardly above the level of liquid in the tank to enable ready connection to a pumping system for drawing the liquid in the tank through the filter media layers for return to the system.

A rotary drive may also be provided for the drum member which is mounted within an impervious upper section of the drum member disposed above the level of the liquid in the tank. This drive may advantageously take the form of an indexing drive including a gear track such as a chain length which is mounted within the interior of the drum member upper section, with rotary gear means such as a sprocket wheel in engagement therewith. A drive arrangement for intermittently rotating the sprocket wheel thus causing an incremental rotary advance of the drum.

Improved backwashing is also provided in which the axial passages are successively subjected to backwashing flow via a backwash passage extending down the length of the central tube to enable ready connection to a source of backwashing liquid at the upper end of the tube, positioned above the level of liquid in the tank. A backwashing porting member causes successive pressurizing of each of the axial passages, by the indexing rotation of the drum member enabling an accurate registration between the porting member and the axial passages in the drum member.

To eliminate the lightweight contaminants discharged by backwashing, open-faced collection trough members are positioned extending axially along the interior and exterior areas of the drum region whereat the filter media is backwashed. A flushing flow is directed through the troughs and is collected preferably by a self-priming pump to remove the fines from the tank.

The entire assembly is readily removable from the tank by means of a foot structure which is fit into fixed support members within the tank which insures proper alignment of the drum member with the collection trough members.

A shroud arrangement may be employed to prevent the entrance of air into the pumping system through the drum member at low liquid levels in the tank. The shroud may have a portion attached to the periphery of the drum member at a level above the filter media layer and an outwardly flared portion extending downwardly to a level about the filter media. The pumping system insures that tank liquid will remain at a level above the filter media even if the tank level declines below that level.

Alternatively, the shroud may be stationary and sealed to the perimeter of the drum member which rotates within the shroud.

DETAILED DESCRIPTION

Figure 1:
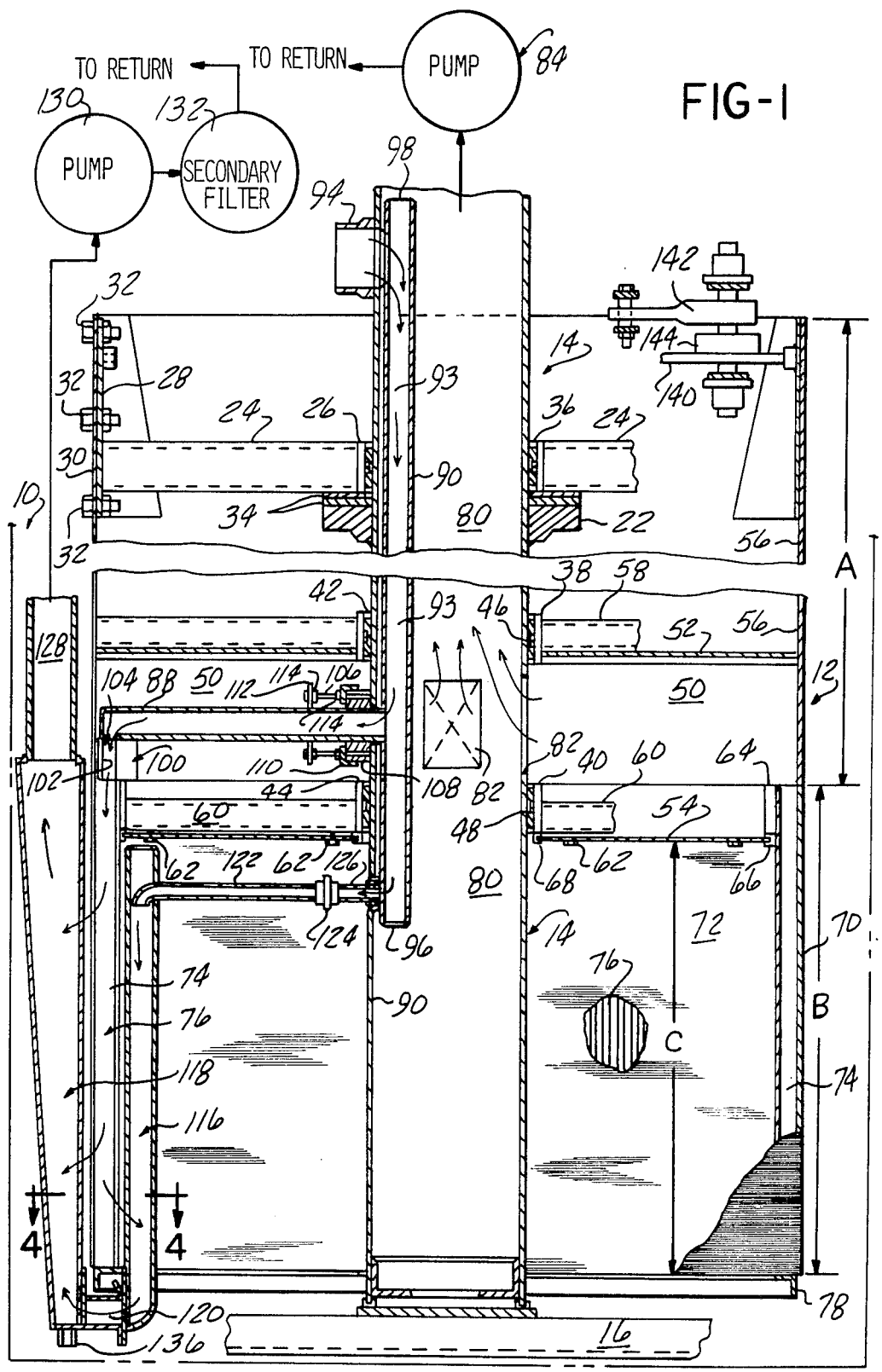
FIG. 1 is a partially sectional view of the filter arrangement according to the present invention together with a fragmentary view of a tank to which it is installed together with a diagrammatic representation of certain of the external components of the filtering system.

Referring to FIG. 1, the filter arrrangement according to the present invention is intended for use in conjunction with a settling tank 10, adapted to receive a liquid to be filtered such as cutting fluids used in the machining processes, to remove metal chips, grit, etc. The heavier contaminants settle to the bottom thereof to be removed by means of a drag conveyor or other such arrangement, not shown in FIG. 1 or disclosed herein inasmuch as this general arrangement is well known to those skilled in the art and does not form a part of the present invention.

The present invention relates to a filter disposed within the tank and adapted to filter out relatively fine particles or contaminents from the liquid prior to its return to the system source.

According to the concept of the present invention, this filter takes the form of a drum member 12 mounted with its axis extending vertically within the settling tank 10 which is adapted to be readily removed from the tank 10 for maintenance, without the need to establish piping connections within the confines of the tank 10 itself.

Figure 5:
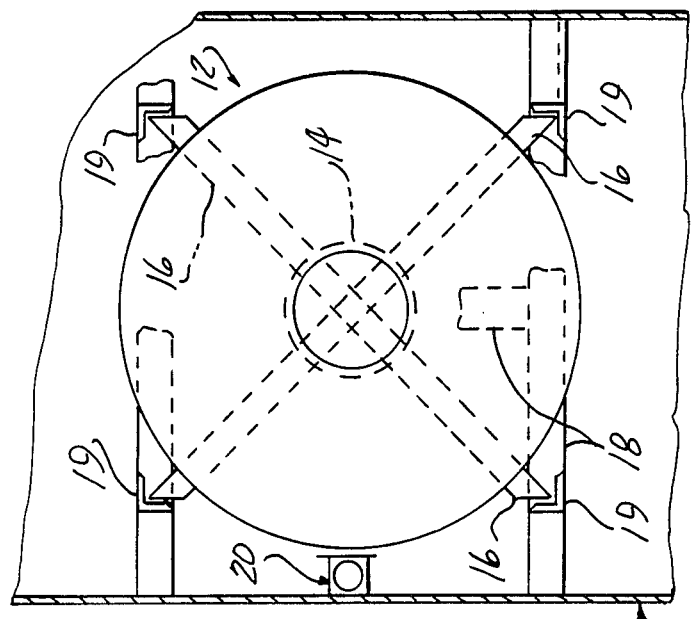
FIG. 5 is a simplified plan view of the mounting of the drum member within a settling tank.

The drum member 12 is mounted for rotation about the central axis thereof in order to carry out a backwashing operation as will be described hereinafter, with the rotational support being provided by a central stationary tube 14 aligned with the central axis of the drum member 12. The stationary tube 14 also supports the weight of the drum member 12 by means of cross members 16 and bottom support members 18 (FIG. 5) provided in the lower region of the settling tank 10. Locating angles 19 cooperate with the cross members 16 to provide an orientation of the drum 12 within the tank 10. This orients the central tube 14 with respect to a stationary trough 20 incorporated for purposes as will be hereinafter described.

The drum member 12 is supported on the central tube 14 by means of a support flange 22 welded to the upper region of the support tube 14 and a plurality of tubular support struts 24 welded at the inside ends to a support collar 26 and at their outer ends to a support ring 28. A support ring 28 is secured to an upper region 30 of the drum member 12 by means of a series of bolt fasteners 32. The weight of the drum member 12 is carried on the support flange 22 with interposed wear rings 34 of suitable bearing material.

A cylinder bearing 36 is also provided interposed between the inside diameter of the support collar and the outside diameter of the central tube 14.

Rotational guiding support is also afforded by guide collars 38 and 40 with corresponding interposed bearings 42 and 44. 0-ring seals 46 and 48 are provided to ensure sealing of the vacuum chamber 50 located intermediate an annular partition disc 52 and an annular partition disc 54, mounted extending between the collars 38 and 40, respectively, and the interior diameter of the drum member 12.

Partition disc 52 is welded about its outer periphery to the drum inside surface 56 whereat the inside diameter is welded to the collar 38 as shown. A plurality of support struts 60 support the collar 40. A partition 54 in turn is fastened by means of a fastener 62 to 60. The outer ring 64 secures the outer ends of the support tubes 60 with gasket rings 66 and 68 sealing the inside and outside diameters of the partition ring 54 against the support collar 40 and outer ring 64.

The upper region of the drum member 12, indicated as region "A" in FIG. 1, is constructed of relatively imperforate cylindrical sheet metal, the lower region of the periphery, region "B", constructed of a filter media layer 70 which may advantageously take the form of "wedge wire" windings which are spaced such as to provide the appropriate degree of filtration in a manner well known to those skilled in the art.

According to the concept of the present invention, the interior of the drum member 12 in region "C" is also provided with a filter media layer 72 which also may advantageously be provided by wedge wire windings.

The respective media layers 70 and 72 are in communication with an annular array of axially extending passages 74 created by the spaced partition bars 76 to which is welded the windings of wedge wire defining the filter media layers 70 and 72 to produce a unitary structure. The orientation of the wedge wire windings constituting filter media layers 70 and 72 is such as to position the narrow side to the exposed surface, such that filtration or screening takes place both inside and outside of the drum member 12.

Filtering flow is thus enabled through both the interior diameter in region "C" and the outer diameter in region "B" of the liquid disposed in the settling tank 10.

The outer ends of each of the passages 74 is sealed off by means of a ring 78 while the upper ends open into the vacuum chamber 50. This provides a means for collecting the filtered flow through the filter media layers 70 and 72 into the axial passages 74. The filter chamber 50 in turn is placed in communication with the interior 80 of the central tube 14 by openings 82 cut into the central tube 14 opposite the vacuum chamber 50 such that the filtered liquid is drawn into the interior and upwardly of the length of the central tube 14. Such flow may be induced by means of one or more pumps which may be connected in banks with suitable header manifolding, as is well known to those skilled in the art, with an external coupling 86 provided at the upper end of the central tube 14 for establishing a piping connection thereto.

It can be appreciated that with the presence of both the interior filter media layer 72 and the exterior peripheral filter media layer 70, a very substantial increase of filter area is available for the filtering process within the volume occupied by the filter drum 12, as compared to the horizontal axis mounting of the aforementioned copending patent application. Furthermore, the connections for establishing a liquid flow may be above the liquid level in the tank where connections may be established without the need for clamping mechanisms or other arrangements within the lower regions of the tank 10.

Vertical orientation of the drum member 12 enables the heavier contaminants which flow into the interior or which are removed by backwashing to settle out of the interior of the drum member 12 and into the lower regions of the settling tank 10 to thus enable a filter media layer to be utilized both on the interior and exterior of the drum member 12.

Backwashing means are also provided which cause each of the axial flow passages 74 to be subjected to a reverse backwashing flow as the drum member 12 is caused to be rotated as in the arrangement shown in U.S. Pat. No. 4,407,720.

The backwash means includes a stationary backwash tube 88 extending radially outward from the central tube 14 adapted to receive a flow of backwash liquid from backwash supply pipe 90 having an internal passage 92 receiving a flow of backwash liquid. The backwash supply pipe 90 extends within the central tube 14 upwards to a coupling 94 provided at the upper end of the central tube 14, enabling a fluid connection to the interior of the passage 92. A source of backwash liquid may be provided from the pump discharge header (not shown). The backwash ends of the supply pipe 90 are sealed by end caps 96 and 98.

The radially extending backwash flow tube 88 has connected thereto a porting block 100 having a port 102 located in registry with a side opening 104 in the backwash flow tube 88. The backwash flow tube 88 passes into an opening in the central tube 14 and into the internal passage 92 of backwash supply pipe 90. Sealing retention therein is provided by studs 106 carried by the exterior of the central tube 14 and a packing ring 108 compressed by means of a collar 110 and an anchoring flange 112 having adjustment nuts 114 to allow compression of the packing ring 108.

The port 102 of the port block 100 is located radially outward a distance to be in registry with the axial flow passages 74 such that as the drum member 12 is rotated, each of the axial flow ports are successively caused to be pressurized with a flow of backwash liquid. A limited number, i.e., two, of the passages 74 are thus pressurized at any given moment. The backwash liquid thus flows into each axial passage 74 and reversely out through the respective filter media outer layers 70 and 72.

According to the concept of the present invention, a further refinement of the backwashing means comprises collection members disposed in both the interior and exterior of the drum member 12 at the location whereat the backwash flow occurs, i.e., in substantial alignment with the backwash flow tube 88 and porting block 102. These collection members comprise an open-faced trough 116 disposed in the interior of the drum member 12 and an openfaced trough 118 disposed adjacent to the exterior of the drum member 12.

Each of the trough members 116 and 118 have open faces thereof facing the drum member filter media surfaces 70 and 72, respectively, such that the backwashing flow tends to be directed into the interior of the respective troughs 116 and 118, carrying with it the relatively light and fine contaminent particles. There is also provided means for generating a flushing flow into the interior trough 116 and thence through a cross passage 120 into the exterior trough 118. Such flushing flow is provided by a tubing member 112 coupled at 124 to an outlet passage 126 connected to a lower end of the backwash supply pipe 92 such that a portion of the backwash flow is diverted into the troughs 116 and 118.

Attached to the upper end of the outer trough 118 is a stand pipe 128 which extends upwardly to enable ready connection to a self-priming pump 130 which draws out the flushing flow from the stand pipe 128 and forces it through a secondary filtration system 132 prior to being returned to to the source of liquid to be filtered.

Figure 4:
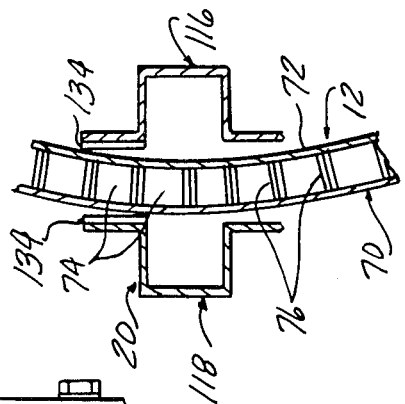
FIG. 4 is a fragmentary sectional view of the region of the filter drum member and adjacent collection trough shown in FIG. 1.
Figure 3:
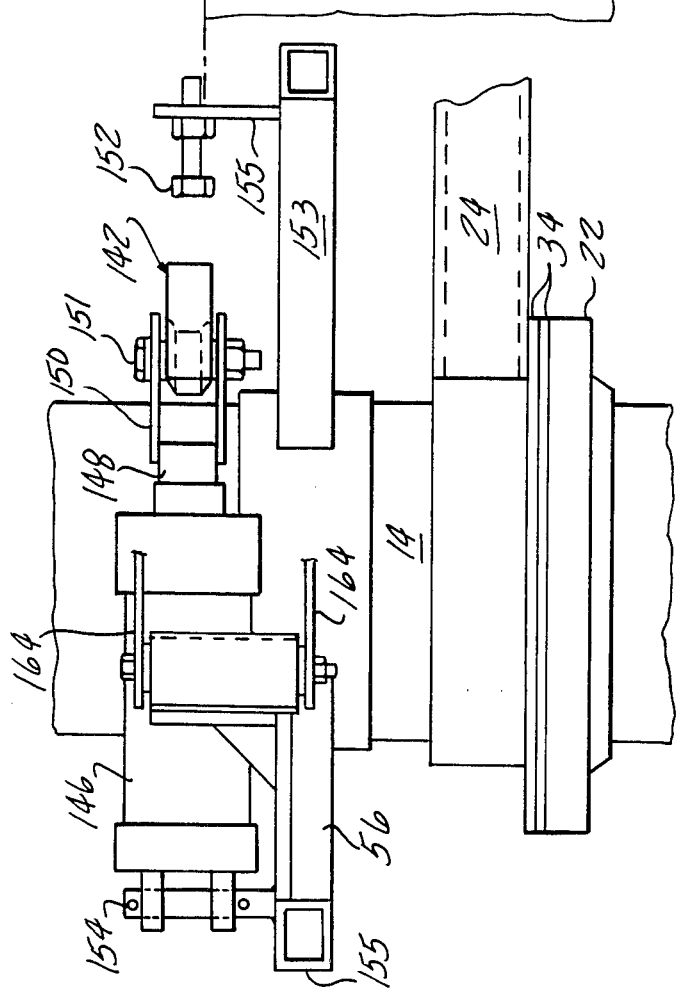
FIG. 3 is a fragmentary elevational view of the drive arrangement shown in FIG. 2.

Each of the troughs, as best seen in FIG. 4, is positioned closely adjacent the internal filter media layer 72 and outer media layer 70, respectively, with a sufficient clearance space on the upstream side of the drum to enable the clearance for the filter cake on the outer surface.

On the return side, wear strips 134 are mounted on the inside face of the trough flange to absorb any incidental contact with the drum member 12 as it rotates therebetween due to any irregularity in the rotation of the drum member 12.

An additional coupling 136 may also be optionally provided to attach a flushing line thereto for introduction of additional flushing flow.

In this arrangement, the lightweight and fine contaminants which would otherwise remain in suspension in the liquid within the tank 10 may be collected and removed from the system such that they do not reaccumulate on the interior or exterior of the filter media layers 70 and 72 after passing through the region whereat backwashing occurs.

As noted, the drum member 12 is mounted for rotation so as to bring each of the axial passages 76 into alignment with the port 102 to successively direct a backwash flow of liquid through the respective areas of the inner filter material media layer 72 and outer filter media layer 70. Drive means for rotating the drum member 12 are thus provided to provide an incremental or indexing rotary advance of the drum member 12 on the central tube 14 corresponding to the circumferential space covered by the port 102. This will insure that none of the passages 74 are skipped during the rotation of the drum member 12.

The drive means include a gear track means which may advantageously take the form of a circular arrangement of chain 138 which is welded or otherwise affixed about the perimeter of the drum liner 28, installed as described above on the upper end of the drum member 12 such as to be readily accessible. Drivingly engaged chain track 138 is a sprocket wheel 140 rotatably mounted on an arm 142 at one end thereof. The arm 142 is drivingly connected to the sprocket wheel 140 so that in one direction of oscillation of the arm 142, the sprocket wheel 140 is rotatably advanced while in the other direction of oscillation, an overrunning occurs such that the sprocket wheel 140 is not rotated to produce an unidirectional intermittent indexed rotation of the sprocket wheel 140 and thus incremental rotation of the drum member 12.

An arm extension may be employed carried by the arm 142 and extending beyond the drum member 12, which mounts a bearing member engaging the outer periphery thereof to absorb any forces tending to cause the sprocket wheel 140 to come out of engagement with the chain track 138.

Means are provided for oscillating the arm 142 comprising a power cylinder 146 having an operating rod 148 which is extensible and retractable in response to actuation of the cylinder 146 and which has a clevis 150 mounted thereto pinned to the opposite end of the arm 142. Arm 142 is thereby oscillated to cause the incremental or indexing advance of the sprocket wheel 140. An adjustable stop 152 is mounted on a support strut 153 welded to a support strap 158. The power cylinder 146 is pivotally pinned at 154 to a support plate 156, in turn secured to a strut 155 welded to a mounting strap 158 bolted at 160 to the central tube 14. A sealant is applied to the bolt 160 threads in order to ensure air is not introduced into the interior.

Figure 2:
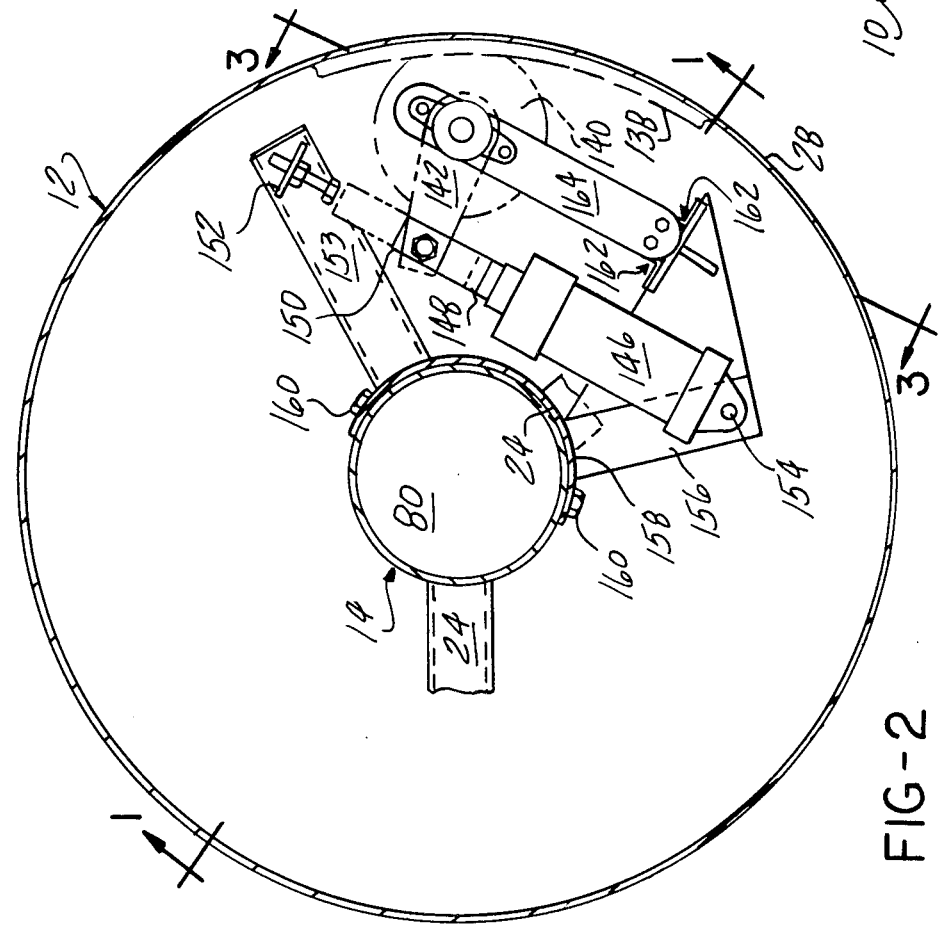
FIG. 2 is a top view of the drum member shown in FIG. 1.

Also supported by the support plate 156 is a tensioner arm 164 spring biased by leaf springs 162 urging the tensioner arm 164 clockwise as shown in FIG. 2 which in turn urges the sprocket wheel 140 into driving engagement with the chain track 138 to ensure that engagement is maintained as the drum member 12 rotates.

Accordingly, the entire drive assembly is fixed such that unidirectional indexing rotation of the sprocket wheel 140 ensures rotation of the drum member 12. The entire assembly is readily accessible and removable by simply removing the bolts 160 of the support strap 158 together with the remaining components.

Accordingly, it can be appreciated that by the present arrangement, the above-recited advantages of the present invention are achieved. The vertical orientation of the drum member provides ready access to the drive components and enables the piping connections to be made above the liquid level in the settling tank to make any required maintenance easier and/or its removal for cleaning and other maintenance operations on the drum assembly.

Furthermore, the vertical orientation of the drum enables the filter media layers to be employed both on the outer periphery and inside surface and the lower region thereof increases the available for filtering action. The use of the sequential backwashing of the axial passages combined with the collecting trough members enables the removable of the fine contaminants while the vertical orientation provides a ready gravity removal and settling out of the heavier particles. The simple drive mechanism provides an incremental advance of the drum such as to provide a closely controlled advancing of the drum member 12 to achieve reliable step-by-step backwash flow operation with the drive components mounted such as to be readily removed for maintenance or replacement.

The backwash arrangement provides an efficient cleaning of the drum 12 such that scraping and other auxiliary operations and/or removal of the drum for cleaning may be substantially obviated.

Figure 6:
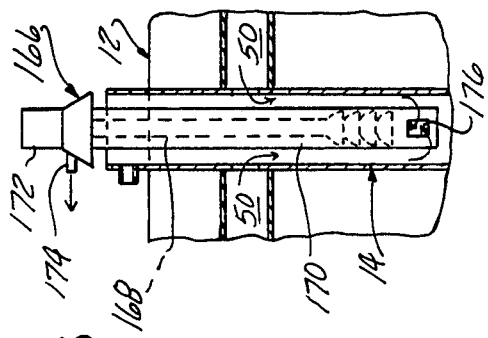
FIG. 6 is a fragmentary partially sectional view of an alternate embodiment of the drum assembly used in the filter according to the present invention.

Referring to FIG. 6, an alternate circulating pump installation is shown utilizing a well-known vertical axial flow pump 166 having a vane shaft 168 with axial flow 169 extending within a "can" 170, installed within the interior of the stationary tube 14. A drive motor 172 drives the pump 166 to draw flow up the can 170 and outlet 174. Thus, the lower end of the can 170 is provided with openings 176 allowing filtered liquid to be drawn through vacuum chamber 50 and into the tube 14, thence to outlet 174. This allows a relatively compact structure for installations not required to be hooked into a header system.

Figure 7:
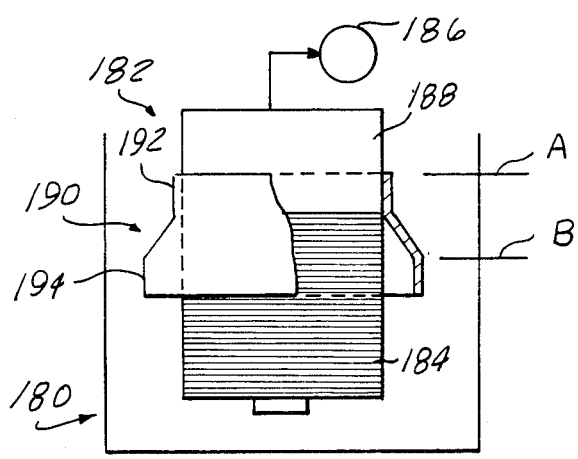
FIG. 7 is a diagrammatic representation of a modification of the drum filter according to the present invention.

Referring to FIG. 7, a modification of the basic arrangement is shown diagrammatically which allows for considerable variation of the liquid level in tank 180 receiving a vertically mounted drum member 182 which may be mounted and constructed as in the above-described embodiments.

The drum member 182 thus includes a lower section 184 which carries a filter media layer on its inner and outer surfaces to allow filtering flow of the liquid in the tank 180 into longitudinal spaces therebetween and drawn into a circulation system 186, as described above. The drum member 182 also includes a solid section 188 located above the filtering layer 184, housing certain of the filter components and extending above the liquid level "A" in the tank 180.

It has been found that there may be considerable variations in liquid level in the tank 180, particularly during start-up after a period of shut down. It has also been found that as the level approaches the level of the filter media section 184, vortices may form which will allow air to begin to enter the system, and interrupt flow of filtered liquid.

According to one aspect of the present invention, a shroud member 190 is provided having a skirt section 192 encircling and affixed to the impervious section 188 of drum member 182 so as to be sealed against liquid flow therebetween.

The shroud 190 also includes a downwardly extending section 194 which is flared radially outwardly over the upper region of the filter media section 184 of the drum member 182.

Upon start-up, the liquid in the tank 180 will be drawn upwardly into the space between the shroud 190 and the filter media section 184, and will be retained therein if suitable check valves are employed in the circulating system 186, even if the liquid declines to a level "B" below the normal level "A". The presence of the shroud 190 thus insures that liquid will cover the filter media section 184, even if there is such a decline in liquid level and also that entry of air into the system through vortices as the level approaches the level of the media layer section 184 will likewise be avoided.

Accordingly, the tank 180 can be more compactly sized since the tank volume need not be depended on to maintain sufficient levels to cover the media layer section adequately to prevent the entry of air, reducing considerably the expense of the system particularly if excavations are required to accommodate the tank 180.

The shroud 190 is affixed to and rotates with the drum member 182 in the modification shown in FIG. 7. The shroud may also be fixed as shown in the arrangement in FIG. 8, which also depicts a simplified drum filter arrangement 200. This includes a tank 202 receiving liquid to be filtered, and having mounted therein for indexing rotation a drum member 204. The drum member includes a lower filter media section 206 which may include inner and outer surface layers communicating with longitudinal passages 208 as in the above-described embodiments. An upper impervious section 210 defines an inner vacuum chamber 212 which receives liquid flow from the passages 208, with an impervious partition 214 insuring that flow will be through these passages and not through the interior of the media layer section 206.

The drum member 204 is surrounded by a stationary shroud 216, which defines an open-bottomed cavity extending downwardly about the exterior of the media layer section 206 of drum member 204. The shroud 216 is formed by a top wall 218 extending horizontally to close off the vacuum chamber 212, and is welded to a vertical stationary piping section 220, which communicates with the vacuum chamber 212.

The upper top wall 218 extends radially outward as shown and is integral with downwardly extending skirt 222 to thus create an annular space between the outer surface of the media layer section 206 and the interior of skirt 222. A liquid filled 0-ring 224 is carried by a collar 226 affixed to the drum member 204, which bears against a stationary ring 228 affixed to the top wall 218 as the drum member 204 rotates. The 0-ring 224 insures that a vacuum can be drawn in the vacuum chamber 212 at start-up, with the liquid filled feature compensating for any dimensional variations introduced during manufacture. A suitable wear strip (not shown) may be included interposed between ring 228 and drum member 204.

The drum member 204 is supported on an index shaft 226 passing through partition 214 and threadably receiving a nut 228 and sealing washer 230 thus serving to support the drum member 204 thereon. The lower end of index shaft 226 passes through a bushing 232 retained with a pilot tube 234 welded to webs 236, in turn welded to the interior of the piping section 220. A washer 238 is welded to the exterior of index shaft 226, with an interposed thrust bearing 240 absorbing thrust loads.

The index shaft 226 extends upwardly through a tube section 242 and is drivingly connected to an oscillating drive unit 244, which is operated to cause oscillation of index shaft 226. Suitable such oscillating drive units are well known and commercially available, and accordingly, the details thereof are not here included.

A ratchet 246 receives the lower end of index shaft 226 and is affixed by partition 214 by bolts 248 as shown to establish a one-way driving connection to the index shaft 226, such that intermittent unidirectional rotation of the drum member 204 is produced by oscillation of index shaft 226.

The piping section connects into a piping system 250 as shown which includes pumping means to cause liquid to be drawn from the tank 202 into longitudinal passages 208, thence into vacuum chamber 212, and through piping section 220. The liquid is thereby caused to fill the interior of shroud 216 as shown, and will remain filled despite fluctuations in level within the tank 202, as long as suitable check valving (not shown) is incorporated in piping system 250. This insures that air is not drawn into the system despite some variation in the tank level.

A stationary backwash porting block 252 having a porting channel 254 formed therein is mounted to the interior of the top wall 218 of shroud 216. The porting channel 254 extends to be aligned successively with passages 208 as the drum member 204 is indexed. A source of backwashing liquid 256 causes backwashing to occur in successive regions of the drum member 204 as the indexing rotation proceeds.

Figure 8:
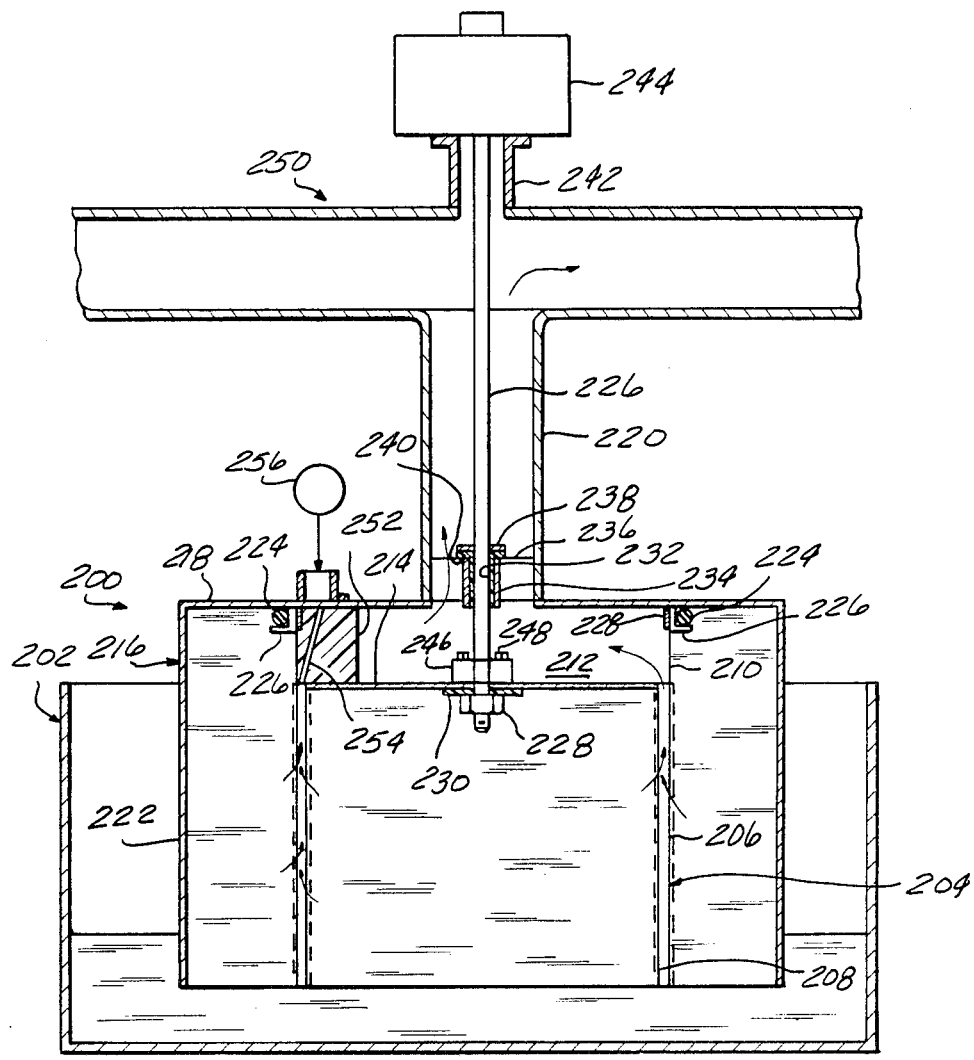
FIG. 8 is a partially sectional view of a drum filter according to the present invention incorporating a variation of the modification shown in FIG. 7.

The filtering arrangement 200, as described in FIG. 8, is relatively portable and can be easily installed into existing settling tanks. Also, the arrangement provides a simplified structure which may be manufactured at low cost.

I claim:

1. A drum filter comprising:
    a tank adapted to receive a quantity of liquid to be filtered from a source;
    a filter disposed in said tank, said filter comprising a drum member having a central axis disposed vertically in said tank and having a filtering section comprised of an annular array of parallel axially extending passages defined in part by a plurality of circumferentially spaced partitions having radially spaced outside and inside edges and outside and inside filter media layers disposed over the outside and inside partition edges said drum being open ended at its lower end disposed in said tank respectively;
    means for drawing liquid in said tank into said passages through both said outside and inside filter media layers simultaneously; and,
    means for collecting filtered liquid drawn into said passages for return to said source;
    means for dislodging contaminants built up on each of said outside and inside filter media layers to clean said filter media layers and means for collecting contaminants dislodged by said means, whereby dislodged contaminants from said inside media layer can settle out through said open end of said drum member.

2. The filter according to claim 1 wherein said drum member is mounted within said tank for rotation about said central axis.

3. The filter according to claim 2 wherein said means for dislodging contaminants includes backwash means for directing a backwash flow into a limited number of said passages successively to enable backwashing of a portion of said filter media layers at a time.

4. The filter according to claim 3 wherein said drum member is mounted for rotation within said tank, and includes drive means for rotating said drum member in said tank, and wherein said backwash means includes a stationary porting member receiving backwash liquid and directing said backwash flow into said axial passages successively as said drum member rotates past said porting member.

5. The filter according to claim 4 wherein said drive means comprises rotary indexing means causing incremental rotation of said drum member.

6. The filter according to claim 4 wherein said backwash means further includes fixed open-faced collection troughs disposed within said tank having an open face extending longitudinally of said drum member, one on the outside and one on the inside immediately adjacent said stationary backwash porting member to receive backwash flow passing through said outside and inside filter media layers respectively, and further including means for directing a flushing flow into said collection troughs to carry off material removed by said backwash flow.

7. The drum member according to claim 2 wherein said means for collecting said filtered liquid includes a vacuum chamber located at the upper end of said drum member, and further including a vertical stationary piping section communicating with said vacuum chamber, and an index shaft mounted within said piping section, means for drivingly engaging said index shaft and said drum member, said drive means for driving said index shaft to drive said drum member.

8. The drum filter according to claim 7 wherein said means for drivingly engaging said index shaft and said drive member comprises a one-way acting ratchet means and wherein said drive means comprises means for oscillating said index shaft to produce intermittent unidirectional rotation of said drum member.

9. The drum filter according to claim 1 further including a shroud member comprised of a portion sealingly engaged with the periphery of said drum at an upper section of said drum, and a radially outwardly extending skirt portion extending downwardly over the periphery of said filter media layers with an annular clearance space therebetween, to define an open-bottomed liquid cavity therein, whereby liquid may be drawn into said cavity to insure covering of said filter media layers.

10. The drum filter according to claim 9 further including means for rotating said drum member, and wherein said shroud is stationary and is sealingly engaged with the periphery of an upper region of said drum member.

11. The drum filter according to claim 10 wherein said drum member is formed with an impervious section located above said filter media layers, and wherein said shroud includes a top wall extending radially outward across said impervious section and means sealingly engaging said top wall and impervious section to define a vacuum chamber within said drum member in fluid communication with said axially extending passages, said top wall extending radially outward from said drum member and joined to said skirt portion thereof.

12. The drum filter according to claim 9 wherein said shroud skirt portion is affixed to said drum member.

13. The filter according to claim 1 wherein said means for collecting liquid drawn into said passages comprises a stationary tube mounted in said tank passing within said drum member and aligned with the axis thereof;
said drum member including an imperforate section extending from said filtering section and a pair of axially spaced imperforate disc partitions mounted within said imperforate section of said drum member defining a radial chamber, one of said disc partitions immediately adjacent said filter section of said drum member and of smaller diameter than the inside diameter of said drum member to open one one end of each of said axial passages into said chamber and wherein swid tube extends into said radial chamber and is formed with at least one opening to allow flow of liquid from said chamber into said tube whereby flow of filtered liquid passes from said tank, through said filter media layers, into said axial passages and is collected in said chamber and passes out through said central tube.

14. A rotary drum filter comprising:
a tank adapted to receive a quantity of liquid to be filtered from a source;
a filter disposed in said tank and including a drum member having a central axis carrying at least one filter media layer on the outer surface thereof, said drum member mounted for rotation about said axis, extending vertically in said tank;
drive means rotating said drum member about said axis;
means for establishing filtering flow of liquid in said tank through said at least one filter media layer; and,
means collecting said filtered liquid for return to said source;
a shroud member comprised of a portion sealingly engaged with the periphery of said drum at an upper section of said drum, and a radially outwardly extending skirt portion extending downwardly over the periphery of said filter media layers with an annular clearance space therebetween, to define an open-bottomed liquid cavity therein, whereby liquid may be drawn into said cavity to insure covering of said at least one filter media layer.

15. The filter according to claim 14 further including a stationary central tube disposed in said tank extending vertically through said drum member, and means rotatably supporting said drum member on said central tube.

16. The filter according to claim 15 further including an axial flow pump having a vane shaft extending with said central tube, and a drive motor positioned thereabove.

17. The filter according to claim 16 wherein said drum member includes a plurality of axially extending, annularly arranged passages defined by circumferentially spaced partitions and wherein said at least one filter media layer is mounted over said partitions to enable flow of liquid in said tank through said filter media into said passages and wherein said means for collecting said flow of filtered liquid passing through said at least one filter media layer comprises means for directing liquid flow through said passages into the interior of said stationary tube.

18. The filter according to claim 17 wherein said drum member axial passages extend for only a portion of the length of said drum member, wherein said at least one filter media layer extends only in the region whereat said axial passages extend, the remaining length of said drum member comprised of an imperforate cylindrical portion and further includes a pair of axially spaced partitions mounted within said imperforate cylinder to define a radial chamber, and wherein the upper ends of said axial passages open into said radial chamber to receive said flow of liquids;
further including means defining at least one opening extending through said stationary tube and into said radial chamber to enable flow from said axial passages into the interior of said stationary central tube.

19. The filter according to claim 18 wherein said backwash means includes means defining a backwash passage extending through said stationary central tube into said radial chamber, and also includes a porting member having means defining an opening receiving flow from said backwash passage and located adjacent the radial location whereat said axial passages are located to direct flow into successive axial passages as said drum member is rotated by said drive means.

20. The filter according to claim 17 further including backwash means for directing a reverse flow of liquid into a limited number of said passages successively as said drum member is rotated to create a backwashing flow through successive regions of said at least one filter media layer.

21. The filter according to claim 15 wherein said means rotatably supporting said drum member further includes a collar received over said stationary central tube and a plurality of support struts affixed to said collar and to the interior of said drum member to provide a spaced rotary support of said drum member on said stationary central tube.

22. The filter according to claim 14 further including backwash means for directing a reverse flow of fluid through said at least one filter media layer to remove contaminants therefrom.

23. The filter according to claim 22 wherein said backwash means includes means for successively backwashing limited adjacent areas of said at least one filter media layer extending the length of said drum member as said drum member is rotated and said at least one filter media layer moves past a fixed location.

24. The filter according to claim 23 wherein said backwash means further includes an open-faced collection trough mounted in said tank at said fixed location and extending vertically and positioned with the open face thereof facing and immediately adjacent said at least one filter media layer on said drum member to receive backwash flow and suspended contaminants and also includes means for establishing a flushing flow of liquid through said trough and collecting said flow to remove said contaminants from said tank.

25. The filter according to claim 24 wherein said means establishing a flushing flow includes means diverting a portion of said backwash flow into said collection trough and also including a self-printing pump having a suction connected to said trough to draw backwash liquid and contaminants from said tank.

26. The filter according to claim 14 wherein said drum member is formed with a cylindrical section located above the region whereat said at least one filter media layer is located, said cylindrical section having an interior diameter and wherein said drive means includes gear track means extending about the said interior diameter of said drum member, further including a rotary gear means mounted to be in engagement with said gear track means and wherein said drive means also includes means for causing indexing rotation of said rotary gear means.

27. The filter according to claim 26 wherein said means for indexing said rotary gear comprises an arm and one-way ratchet drive means drivingly connecting said arm and said rotary gear means, and further includes means for oscillating said arm to produce said indexing of said rotary gear means and indexing advance of said drum member.

28. The filter according to claim 27 wherein said means for oscillating said arm comprises a power cylinder having an operating rod and means drivingly connecting said operating rod and one end of said arm and means for activating said power cylinder and extending and returning said operating rod to oscillate said arm.

29. A filter arrangement comprising: from
a tank adapted to receive liquid to be filtered from a source;
a filter disposed within said tank, said filter including a drum member and at least one filter media layer covering said drum member;
means mounting said drum member for rotation in said tank;
drive means for rotating said drum;
means for establishing a filtering flow of said liquid in said tank to be filtered through said filter media layer on said drum member and also including means for collecting the filtered liquid for return;
backwash means including means for directing a reverse flow of liquid through said at least one filter media layer on said drum member at localized regions thereof successively across said at least one filter media layer; and
backwash collection means including an open-faced collection trough member positioned with said open face adjacent the periphery said drum member with said open face immediately adjacent at least one filter media layer so as to receive said backwashing flow liquid and contaminants as each successive region is subjected to said backwashing flow as said drum member is rotated and also including means for establishing a flow of liquid along said collection trough member in a direction to draw off said backwash liquid received in said collection trough member and directing said collected liquid out of said tank to thereby remove said contaminants from said tank.

30. The filter arrangement according to claim 29 wherein said backwash means further includes a stand pipe extending vertically upward from said tank, said stand pipe connected at its lower end to one end of said collection trough member, said backwash collection means further including a self-priming pump having a suction and delivery side and wherein said suction side of said pump is connected to the upper end of said stand pipe and further including a secondary filter connected to the delivery side of said self-priming pump to enable secondary filtration of said flow liquid collected by said collection trough.

* * * * *